United States Patent Office 3,483,238
Patented Dec. 9, 1969

3,483,238
BRIDGED π-ALLYL COMPOUNDS OF MOLYBDENUM AND TUNGSTEN
Henry Drummond Murdoch, Ashtead, Surrey, England, assignor to American Cyanamid Company, Stamford, Conn., a corporation of Maine
No Drawing. Filed May 20, 1966, Ser. No. 551,541
Int. Cl. C07f 11/00; C07c 3/10
U.S. Cl. 260—429                                                     5 Claims

ABSTRACT OF THE DISCLOSURE

π-Allyl complexes having the formula

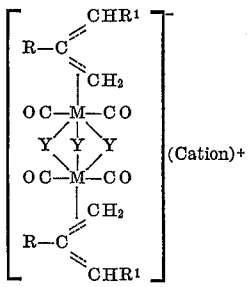

in which M is molybdenum or tungsten, R and R¹ are hydrogen or lower alkyl and Y is Cl, Br, OH, alkoxy or SC₆H₅. The compounds have utility as catalysts for cyclo-polymerization of butadiene and other diolefins.

---

This invention relates to new π-allyl complexes of molybdenum and tungsten and to methods of making them.

Allylic complexes of molybdenum and tungsten are useful in the cyclo-polymerization of butadiene and other diolefins, and the new π-allyl complexes of the present invention have this same utility. Attempts to prepare allylic complexes of molybdenum or tungsten in the past have only been successful where the complex also contained the cyclopentadienyl radical. The present invention for the first time produces π-allyl complexes of the metals free from cyclopentadienyl radicals and of new chemical composition.

An initial reaction with compounds having an anionic halopentacarbonyl molybdenum or tungsten with an allyl chloride or bromide produces the corresponding compounds of tri-μ-halo-bis (π-allyl dicarbonyl molybdenum or tungsten). The cation of the compounds is not critical and may be any cation which does not adversely react with the other reagents. Tetraalkylammonium, and preferably tetraethylammonium, is a very suitable cation and will be described as typical in the more specific description below. The invention, however, is not limited thereto, as it is the anion halopentacarbonyl molybdenum or tungsten which is the significant factor in the reaction. The compounds produced have the formula:

I.

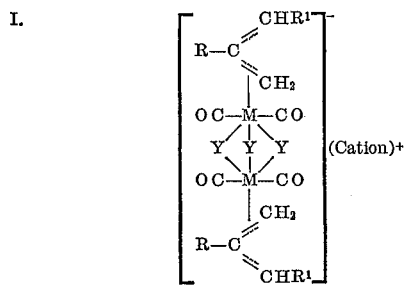

in which R and R¹ are hydrogen or alkyl, M is molybdenum or tungsten, and Y is chlorine or bromine. For simplicity in setting forth the equation, a reaction with the tetraethyl ammonium salt and with 2-methyl allyl halide is set forth. The equation is as follows:

2[NEt₄]⁺[M(CO)₅X]⁻ + 3C₄H₇Y → 6CO + [NEt₄]⁺
[M₂Y₃(C₄H₇)₂(CO)₄]⁻ + C₄H₇X + [NEt₄]⁺X⁻ in which X is chlorine, bromine or iodine, and Y is chlorine or bromine. The compounds in the case of molybdenum, have the formula:

II.

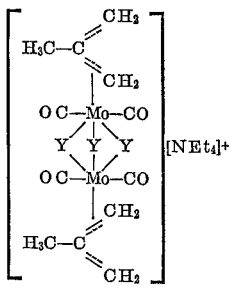

It will be noted that the halogens bridging the two metal atoms in the molecule are derived only from the halogen in the allyl halide used.

The compounds set out above are useful and are included in the present invention. It is, however, also possible to produce different complexes by reacting the above compounds either to introduce a different group at Y or to split the bridge. For simplicity, reactions with compounds of Formula II will be described as a typical instance.

The first type of reaction substitutes a different group for the halogen at Y. Thus, for example, by a reaction with a strong base, such as sodium hydroxide or a quaternary ammonium hydroxide such as tetraethyl ammonium hydroxide, in an alcohol as solvent, the corresponding alkoxy group can be introduced. It is also possible to change Y to thiophenyl by reacting the tri-μ-chloro complex with sodium thiophenylate or with sodium carbonate in the presence of thiophenol. Of course the corresponding potassium salts may be used. Another reaction with sodium hydroxide or tetraethyl ammonium hydroxide changes the Y to OH.

The positions of the bridging groups Y were determined by infrared and nuclear magnetic resonance spectra investigation. In the case of all of the Y's except SPh the three positions were not equivalent, one of the Y's being different from the other two.

In general the complexes of Formulas I and II are yellow crystalline solids, moderately soluble in methylene chloride and very soluble in more polar solvents, such as dimethyl sulfoxide. They are relatively stable in air in the solid state but are less so in solution, there being a significant difference between the molybdenum and the tungsten complexes, the former being the more stable. Also, with the exception of the tri-μ-chloro complexes, the tungsten complexes crystallized with difficulty.

When the halogen bridging atoms are replaced by other groups, such as alkoxy or hydroxy, the color of the solids remains pale yellow, but the stability against oxidation is markedly lower than the parent halogen complexes. All are rapidly oxidized by air. For this reason, in the more specific disclosure below, reactions are carried out under non-oxidizing conditions, preferably in an atmosphere of nitrogen.

It is also possible to split the bridge between metals by reaction with amines, such as for example pyridine, 2,2'-dipyridyl, and diamines such as ethylenediamine. When the reactions are with the molybdenum compounds shown in Formula II, the following compounds are obtained:

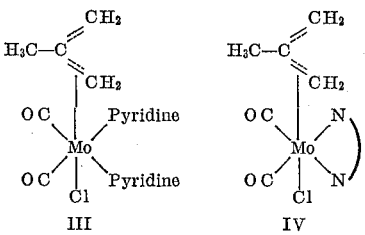

in which

is one of the bidentate amines mentioned above. It is also possible to produce the compounds of Formula IV by reaction with compounds of Formula III. In this case an excess of amine is not needed, as is required when the reaction is directly with the halogen complexes.

It is interesting to note that when dissolved in dimethyl sulfoxide there is no change of the π-allyl radical to a σ-allyl, whereas this takes place with π-allyl complexes of palladium in the same solvent. The reason for the stability of the complexes of the present invention is not known, but it is a definite property of the compounds.

The invention will be described in greater detail in connection with the following specific examples in which the parts are by weight unless otherwise specified. As the reaction is a general one in producing the halo complexes, it will be described in detail for one compound and the others will be set out in an accompanying table.

EXAMPLE 1

A mixture of 3 gr. of [NEt$_4$][MoCl(CO)$_5$] and a large excess of allyl bromide, 2 gr., were stirred in 75 ml. of tetrahydrofuran at room temperature until the infrared bands of the original compound in the 2070 to 1800 cm.$^{-1}$ had disappeared. This took from about 4 to 6 hours. The reaction mixture was then filtered and the solvent removed by distillation under reduced pressure. The products were kept at 50° C. for 1 hour under high vacuum to remove traces of molybdenum hexacarbonyl and were then recrystallized from a methylene chloride-petroleum ether mixture.

The reactions were repeated with other reactants, (using a temperature of 40° C. in the case of tungsten), and the resulting physical properties for the various compounds are set forth in the following table based on Formula I, with the cation being [NEt$_4$]$^+$:

| Reactants | Products | | | Melting Point, ° C. |
| --- | --- | --- | --- | --- |
| | R | R$^1$ | Y | |
| 1. M=Mo, X=Cl; allyl bromide | H | H | Br | |
| 2. M=Mo, X=Br; allyl bromide | H | H | Br | 142-3 |
| 3. M=Mo, X=I; allyl bromide | H | H | Br | |
| 4. M=Mo, X=Cl; 2-methylallyl chloride | CH$_3$ | H | Cl | |
| 5. M=Mo, X=Br; 2-methylallyl chloride | CH$_3$ | H | Cl | 168-9 |
| 6. M=Mo, X=I; allyl chloride | H | H | Cl | 151-2 |
| 7. M=Mo, X=I; 1-methylallyl chloride | H | CH$_3$ | Cl | 123-4 |
| 8. M=Mo, X=Br; 1-methylallyl bromide | H | CH$_3$ | Br | 131-2 |
| 9. M=W, X=Br; allyl bromide | H | H | Br | 115-20 |
| 10. M=W, X=Br; allyl chloride | H | H | Cl | 137-8 |
| 11. M=W, X=I; 2-methylallyl chloride | CH$_3$ | H | Cl | 147-8 |

It will be noted, as has been described above, that compounds 1, 2 and 3 were the same, and compounds 4 and 5 were the same, as the halogen represented by Y is derived only from the allyl compound and is not affected by the halogen attached to the metal carbonyl. Yields were high, ranging from 80% to 90% with the exception of line 7 where the yield was somewhat lower but still better than 50%.

EXAMPLE 2

2 gr. of tetraethylammonium tri-μ-chloro-bis(2-methyl-π-allyldicarbonylmolybdenum) were suspended in 100 ml. of 20% aqueous sodium hydroxide solution and 20 ml. methanol was added. The mixture was heated to 40° until the reaction was complete, and a yellow solid was then filtered off, washed with 20 ml. of water, dried, and recrystallized from a methylene chloride-petroleum ether solution. It was in the form of yellow crystals having a melting point of 160-162°, the yield being about 80%. The compound corresponded to Formula I, in which Y is OCH$_3$.

EXAMPLE 3

0.5 gr. of tri-μ-chloro complex of Example 2, 1 gr. of sodium carbonate, and 20 ml. anhydrous methanol were heated at 40° C. until the reaction was complete. The mixture was filtered, the solvent removed under reduced pressure, and the residue extracted with methylene chloride and recrystallized from a methylene chloride-petroleum ether mixture. The product proved to be identical with that of Example 2.

EXAMPLE 4

0.5 gr. of the tri-μ-chloro complex of Example 2 were mixed with a solution of 0.5 gr. metallic sodium in 30 ml. of methanol and allowed to stand at room temperature overnight. The solvent was then evaporated and the residue extracted and recrystallized from a methylene chloride-petroleum ether mixture. It proved to be identical with the compound obtained from Examples 2 and 3.

EXAMPLE 5

The procedures of Examples 2 to 4 were repeated substituting ethanol for methanol. The resulting products, which were identical, corresponded to Formula I, in which Y is OC$_2$H$_5$.

EXAMPLE 6

0.5 gr. of the tri-μ-chloro complex of the preceding examples and 1.1 gr. of sodium thiophenoxide were mixed in 50 ml. of tetrahydrofuran and allowed to stand at room temperature for 24 hours. The mixture was then filtered, evaporated to dryness, and the residue extracted with a mixture of benzene and methylene chloride. After evaporation of the solvent and recrystallization from methylene chloride, the tri-μ-thiophenoxy complex was obtained as yellow-brown needles. It melts at 162-165° C. and corresponds to Formula I, in which Y is SPh.

EXAMPLE 7

0.5 gr. of the tri-μ-chloro complex of the preceding examples was stirred in 5 ml. of thiophenol with 1 gr. of sodium carbonate at room temperature until the reaction appeared complete. Excess thiophenol was then distilled off under reduced pressure and the residue extracted with methylene chloride. The solution was then filtered through an alumina column which was washed with methylene chloride. From the eluate the product was obtained after recrystallization from a methylene chloride-petroleum ether mixture and proved to be identical with that of Example 6, but the yield was somewhat more than twice as great.

EXAMPLE 8

1 gr. of the tri-μ-chloro complex of the preceding examples was stirred for three days with an aqueous solution of sodium hydroxide (25%, 150 ml.). The reaction mixture was then filtered and the yellow solid residue dried under high vacuum and eluted with methylene chloride. The material was only partially soluble. The solution was dried and the solvent evaporated, producing the tri-μ-hydroxy complex in which the formula corresponded to Formula II, with Y being OH. The product melted at 140–145° C. with decomposition. The residue, insoluble in methylene chloride, was washed briefly with water and dried. This was the sodium salt instead of the tetraethyl ammonium salt described above, the proportions being approximately as 1 part tetraethyl ammonium salt to 1.5 parts of sodium salt.

EXAMPLE 9

The procedure of Example 8 was repeated but instead of sodium hydroxide 30 ml. of a 25% solution of tetraethyl ammonium hydroxide was allowed to stand for 48 hours. A yellow solid was obtained which proved to be identical with the tetraethyl ammonium salt of Example 8.

EXAMPLE 10

The tri-μ-hydroxy complex of Examples 8 and 9 was dissolved in methanol to which some sodium was added. After standing for half an hour, water was added and the precipitated solid filtered off, dried and crystallized from a methylene chloride-petroleum ether mixture. It proved to be identical with the tri-μ-methoxy produced according to Examples 2 to 4.

EXAMPLE 11

0.5 gr. of the tri-μ-chloro complex of the preceding example was dissolved in 25 ml. of carbon tetrachloride with sufficient pyridine (5 ml.) to effect solution. After 1 hour the reaction mixture was filtered to eliminate the tetraethyl ammonium chloride and the solution evaporated to dryness. A yellow solid was obtained which on crystallization from a methylene chloride-petroleum ether mixture melted at 115–117° C. with decomposition. This compound, obtained in excellent yield, proved to correspond to Formula III.

EXAMPLE 12

1 gr. of the tri-μ-chloro complex of the preceding examples was dissolved in 50 ml. tetrahydrofuran and 0.5 gr. of 2,2′-dipyridyl added. The solution became red, and after 2 hours a red crystalline precipitate was formed. This was filtered off, washed quickly with dilute HCl, then with water, dried and crystallized from chloroform. The product was very insoluble but crystallization was possible with a large volume of solvent. The product melted at 234–238° C. with decomposition and corresponds to the product of Formula IV, in which

is 2,2′-dipyridyl.

EXAMPLE 13

The product of Example 11 was dissolved in tetrahydrofuran and 2,2′-dipyridyl added in slight excess. The complex of Example 12 precipitated immediately in theoretical yield, and on purification as described in Example 12 proved to be identical with that product.

EXAMPLE 14

0.5 gr. of the tri-μ-chloro complex of the preceding examples was suspended in 25 ml. of petroleum ether and treated with 10 ml. of ethylenediamine, the mixture being stirred for 12 hours. A solid crystalline material was filtered off, washed with water, dried and recrystallized from a methanol-carbon tetrachloride mixture. It formed yellow needles melting at 215–220° C. with decomposition. The yield was high and the product corresponded to Formula IV in which

is $H_2N(CH_2)_2NH_2$.

The modification in which there is no bridge, Formulas III and IV, have been illustrated in connection with pyridine and ethylenediamine. Instead of pyridine substituted pyridines, such as the picolines, ethyl pyridines and lutidines, may be used. Other heterocyclic bases are quinoline, imidazolone and triazines. The diamine can also be 1,2-diaminopropane or 1,3-diaminopropane.

I claim:

1. A π-allyl complex free from cyclopentadienyl groups having the formula

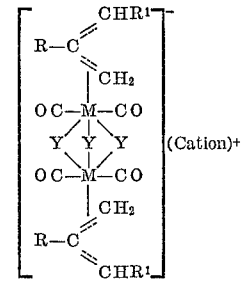

in which M is selected from the group consisting of molybdenum and tungsten, R and $R^1$ are selected from the group consisting of hydrogen and lower alkyl and Y is selected from the group consisting of Cl, Br, OH, alkoxy and $SC_6H_5$.

2. A complex according to claim 1 in which M is molybdenum.

3. A complex according to claim 1 in which the cation is tetraethylammonium.

4. A complex according to claim 3 in which R is methyl and $R^1$ is hydrogen.

5. A complex according to claim 4 in which Y is chlorine or bromine.

References Cited

Cousins et al.: J. Chem. Soc., 1963, pp. 889–890.

TOBIAS E. LEVOW, Primary Examiner

A. P. DEMERS, Assistant Examiner

U.S. Cl. X.R.

252—431; 260—248, 270, 283, 299, 666